Figure 1:
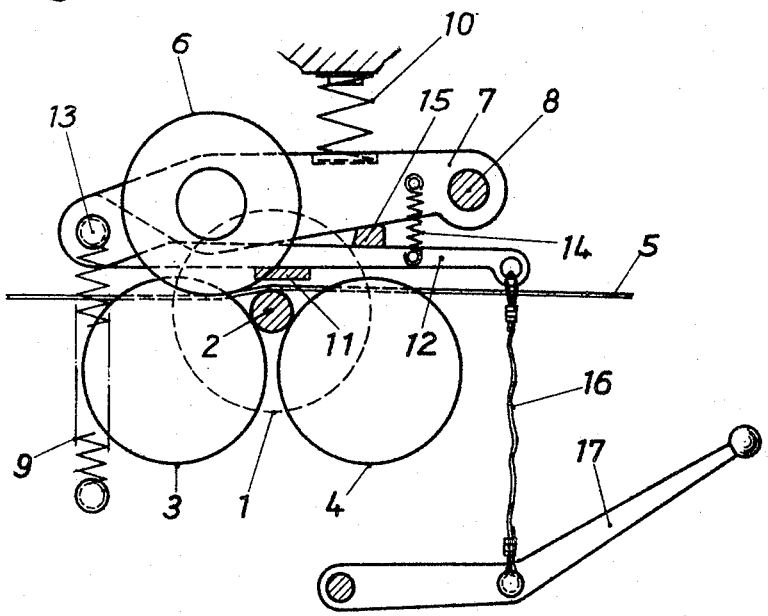

United States Patent [19]
Stahlecker

[11] 3,868,815
[45] Mar. 4, 1975

[54] DRIVE AND BRAKE MECHANISM FOR AN OPEN-END SPINNING ASSEMBLY

[75] Inventor: Fritz Stahlecker, Bad Uberkingen, Germany

[73] Assignee: Wilhelm Stahlecker, Reichenbach, Germany

[22] Filed: Aug. 18, 1972

[21] Appl. No.: 281,759

[30] Foreign Application Priority Data
Aug. 18, 1971 Germany............................ 2141276

[52] U.S. Cl....................... 57/88, 57/58.89, 57/105, 192/144
[51] Int. Cl........ D01h 1/24, D01h 7/22, D01h 1/12
[58] Field of Search ........ 57/77.45, 78, 88, 92, 103, 57/104, 105, 58.89–58.95; 192/15, 16, 144

[56] References Cited
UNITED STATES PATENTS

| | | | |
|---|---|---|---|
| 676,056 | 6/1901 | Tynan | 57/88 |
| 676,057 | 6/1901 | Tynan | 57/88 |
| 2,023,407 | 12/1935 | Cobb | 57/88 X |
| 2,718,747 | 9/1955 | Honig | 57/88 |
| 2,892,302 | 6/1959 | Whitehead | 57/88 |
| 3,016,680 | 1/1962 | Warnock | 57/88 |
| 3,036,421 | 5/1962 | Schroder | 57/88 |
| 3,141,288 | 7/1964 | Carroll | 57/88 |
| 3,662,532 | 5/1972 | Stahlecker | 57/58.89 |

FOREIGN PATENTS OR APPLICATIONS

| | | | |
|---|---|---|---|
| 1,901,453 | 8/1970 | Germany | 57/58.89 |
| 462,944 | 3/1937 | Great Britain | 57/88 |
| 1,913,728 | 10/1970 | Germany | 57/103 |

Primary Examiner—John W. Huckert
Assistant Examiner—Charles Gorenstein
Attorney, Agent, or Firm—Craig & Antonelli

[57] ABSTRACT

An arrangement for driving and braking a rotatable turbine shaft of an open-end spinning assembly. The braking and driving mechanisms are interconnected with one another such that the reaction forces on the braking mechanism during braking operations operates to move the driving mechanism into disengagement. In several embodiments, the driving mechanism is mounted on a swivel arm which is pivotally attached to a brake arm containing the brake lining, with the pivot axis of the swivel arm, the spacing of the brake lining and the driving mechanism from one another and from the pivot axis of the swivel arm, along with the pivotal axis of the connection between the brake arm and swivel arm being such as to assure a transfer of brake reaction forces to disengage the driving mechanism. In another embodiment, the driving mechanism is mounted on a swivel arm and a tapered brake lining is slidably mounted in the swivel arm such that engagement of the brake lining with the turbine shaft causes a reaction force to pivot the swivel arm and associated driving mechanism out of driving engagement with the turbine shaft. The arrangement can be used on spinning turbines with either friction wheel or tangential belt drives, with the swivel arm being attached to either the friction wheel or to a roller for pressing the tangential belt into driving engagement. Also, a separate brake for the friction wheel or belt roller is provided for slowing down the driving mechanism once it becomes disengaged from the shaft or belt.

55 Claims, 10 Drawing Figures

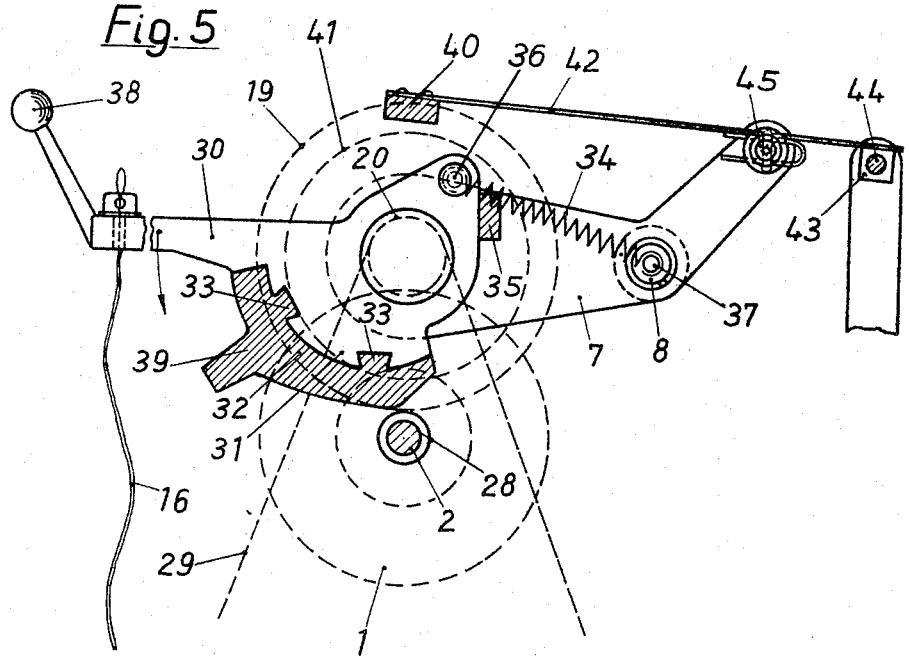
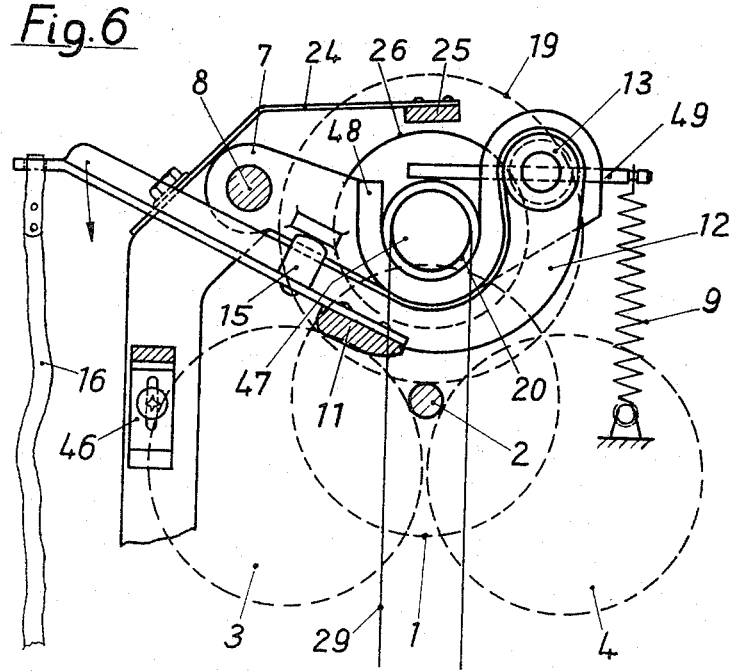

3,868,815

DRIVE AND BRAKE MECHANISM FOR AN OPEN-END SPINNING ASSEMBLY

This invention relates to a drive and brake mechanism for an open-end spinning assembly comprising a brake lining which, for braking purposes, can be adjusted with respect to a turbine shaft of a spinning turbine, this shaft being preferably supported in a V-slot formed by supporting disks, and a drive means which can simultaneously be lifted off from the turbine shaft.

In drive and brake mechanisms of the above-mentioned type, care must be taken that the chronological sequence of the engagement of the brake and the disengagement of the drive means is accurately maintained. If the brake engages too early, the drive means is under an unnecessarily high stress, resulting in an increased wear and tear on the brake as well as on the drive means. In case the turbine shaft is supported in the V-slot by bearing roll pairs, there is the danger upon a belated engagement of the brake that the turbine shaft is not guided over a short period of time. Besides, the time period from the beginning of the brake actuation to the standstill of the turbine is thereby unnecessarily prolonged. The chronological sequence is also of considerable significance when the turbine is set into operation, since the drive means must be prevented from becoming fully effective while the brake is still engaged.

In conventional and already proposed types of construction of the drive and brake mechanisms of the type mentioned in the foregoing, an exact adjustment of the actuating means and/or the transmission means must be effected in order to maintain the exact time sequence. If the adjustment operation is done carefully, satisfactory results can be achieved. However, the adjusting procedure requires time and furthermore skilled personnel, frequently not available. Besides, the adjustment must be examined after a certain operating period and, if necessary, an additional adjustment must be made.

The invention is based on the problem of providing a drive and brake mechanism of the type mentioned hereinabove, wherein the chronological sequence of engagement and disengagement of the brake, as well as the contact and lift-off of the drive means is exactly determined without the necessity of adjustment operations. The invention resides in that, at a movable element receiving the drive means, a structural component carrying the brake lining and connected to an operating element is movably mounted in such a manner that the force of reaction effective on the brake lining during braking can be transmitted to the drive means as disengagement force. In such a construction, the possibility of the occurrence of chronological shifts between the two functions is prevented with certainty, even if tolerances, unavoidable in the manufacture, combine unfavorably with one another and are added up. Besides, assurance is obtained that the chronological sequence is not changed even if, for example, the brake linings have been worn down after a certain operating time. The same likewise holds true if, for example, the vertical position of the turbine shaft is no longer accurate, due to worn fittings of the supporting disks.

In an advantageous embodiment of the invention, the provision is made to mount the drive means, in a manner known per se, on a preferably spring-biased swivel arm at which the component carrying the brake lining is displaceably or pivotably mounted, the operating element engaging this component. This construction, advantageous because of its compactness, makes certain that a lifting off of the drive means, as well as its contacting with respect to the turbine shaft takes place only indirectly and in dependence on the brake lining, since the operating element is articulated only indirectly, namely via the component carrying the brake lining.

Additional features and advantages of the invention will be seen from the following description and illustration of several embodiments in conjunction with the dependent claims.

Figure 2:
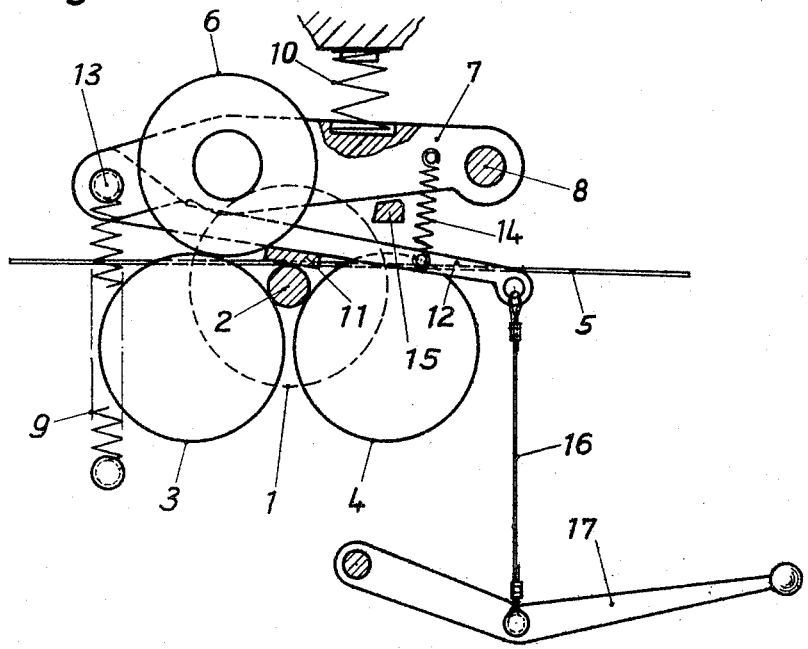
Figure 3:
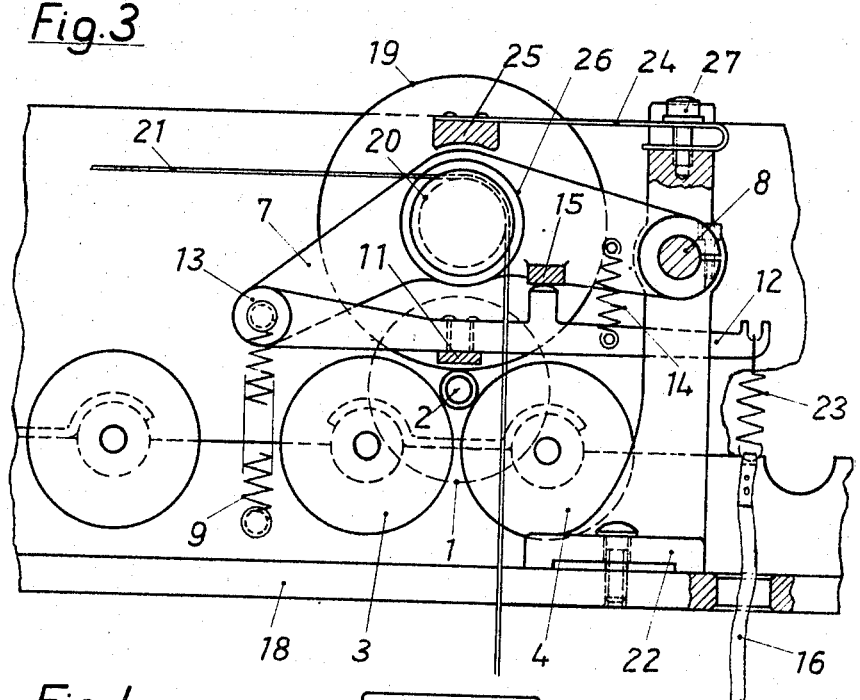
Figure 4:
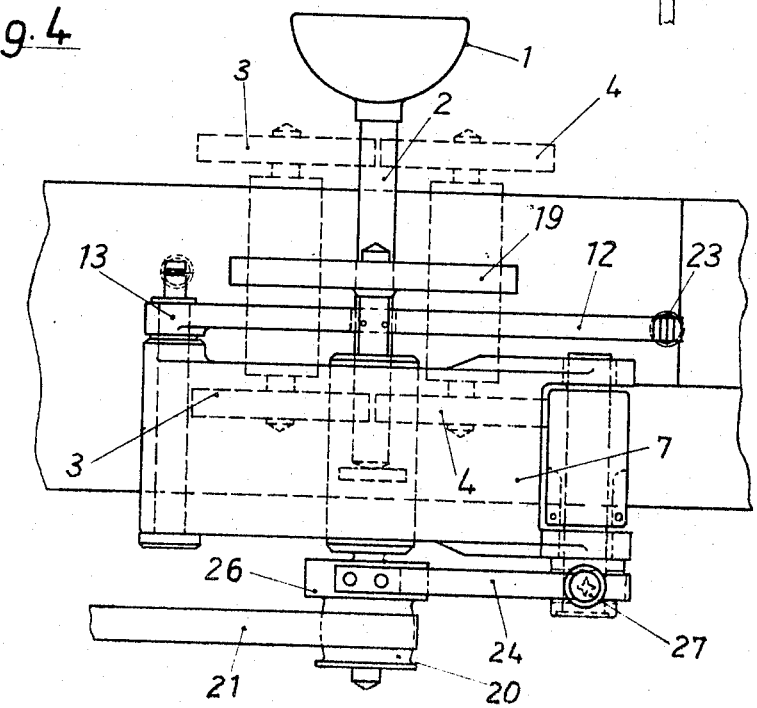

FIG. 1 shows a schematic view of a drive and brake mechanism according to this invention in the operative condition, FIG. 2 shows the drive and brake mechanism of FIG. 1 in the braking condition, FIG. 3 is a view of a further embodiment of the invention, FIG. 4 is a top view of the embodiment of FIG. 3, and FIGS. 5 through 10 illustrate additional embodiments of the invention.

In FIG. 1, a spinning turbine 1 is indicated only in dashed lines; the turbine shaft 2 of this spinning turbine is supported in a V-slot formed by two supporting disk pairs 3 and 4. The turbine shaft 2 is driven via a tangential belt 5 directly contacting the shaft; this belt serves for driving the spinning turbines of several spinning assemblies disposed side-by-side. The tangential belt 5 is pressed onto the turbine shaft 2 in the zone of the turbine shaft 2 by means of a pressure roll 6 so that a sufficient belt tension is provided. The pressure roll 6 is mounted in a swivel arm 7 with the pivot axle 8, this arm being under the load of springs 9 or 10. In practice, only one of the springs 9 or 10 will probably be sufficient.

In order to be able to arrest the horizontally disposed turbine shaft 2, a brake is provided consisting essentially of a braking lining 11 which can be adjusted from above with respect to the turbine shaft 2. This brake lining 11 is carried by a brake arm 12 mounted, by means of a joint 13, to the free end of the swivel arm 7 extended beyond the pressure roll 6. The brake arm 12 is provided below and approximately in parallel to the swivel arm 7, so that the brake lining 11 and the pressure roll 6 are disposed relatively closely together in the zone of the turbine shaft 2. The operating position shown in FIG. 1, wherein the pressure roll 6 presses the tangential belt 5 against the turbine shaft 2 and wherein the brake lining 11 is lifted off from the turbine shaft 2, is secured by means of a tension spring 14 suspended in pins of the swivel arm 7 and of the brake arm 12. Between the brake arm 12 and the swivel arm 7, a buffer 15 of a synthetic resin is provided.

A drawstring 16 is hung into the free end of the brake arm 12, the other end of this drawstring being connected to a brake lever 17.

When the brake lever 17 is pivoted downwardly and thus the drawstring 16 is tensioned, the force of the spring 14 is first overcome, so that the brake lining 11 comes into contact with the turbine shaft 2. Upon a further movement of the brake lever 17, the free end of the brake arm 12 is further pulled downwardly so that the joint 13 is lifted. Thereby, the pressure roll 6 is simultaneously lifted off from the turbine shaft 2. This disengagement of the pressure roll 6 takes place against the bias of springs 9 and/or 10, which thereby determine the brake force to be expended, i.e., the force with which the brake lining 11 is pressed against the turbine shaft 2. This construction ensures that the turbine shaft 2 is under radial load at any time and thereby is urged into the V-slot formed by the pairs of supporting rolls 3 and 4. A minor chronological overlapping results during which the tangential belt 5 is still pressed against the turbine shaft 2 by the pressure roll 6 while the brake lining 11 is already in contact with the shaft. However, as soon as the braking force is increased by a further depression of the brake lever 17, the pressure roll 6 is automatically lifted.

This chronological sequence of the two functions is also maintained after the parts subjected to wear and tear, namely the supporting disks 3 and 4 and the brake lining 11, have been worn down somewhat after a longer operating period.

The reverse sequence occurs when the spinning turbine 1 is started up again, in an analogous manner, wherein, while the braking effect is lessened, the pressure roll 6 is lowered onto the tangential belt 5 and only then the brake lining 11 is lifted off from the turbine shaft 2. Since here again, a certain time overlapping is provided, the gentle startup of the spinning turbine is obtained as desired in practice without any fear of appreciable wear and tear.

It is, of course, also possible to move the free end of the brake arm 12 by means of a different operating device. For example, a fixedly mounted eccentric disk can be provided adjustable directly by a brake lever and contacting a lining of the free end of the brake arm 12.

The embodiment of the invention illustrated in FIGS. 3 and 4 corresponds, in principle, to that of FIG. 1. Also in this embodiment, two supporting disk pairs 3 and 4 arranged in a longitudinal bench 18 are provided which form a V-slot in which the turbine shaft 2 of a spinning turbine 1 is disposed. The turbine shaft 2 is driven, in this embodiment, via a friction wheel 19 serving as the drive means; this wheel is supported in a swivel arm 7 with the pivot axle 8. The friction wheel 19 is provided with a whorl 20 driven by a band 21. The swivel arm 7 is supported with a pivot axle 8 in a column 22 projecting upwardly from the longitudinal stand 18. At the free end of the swivel arm 7, a brake arm 12 is mounted with a joint 13; this brake arm exhibits a brake lining 11 located above the turbine shaft 2. A tension spring 14 and a buffer 15 of a synthetic resin are disposed between the swivel arm 7 and the brake arm 12. The swivel arm 7 is pulled downwardly by the belt 21 which extends around the whorl 20 with an angle of 90°. Additionally, a tension spring 9 is provided which enhances this force, so that the friction wheel 19 securely contacts the turbine shaft 2.

A drawstring 16 engages the free end of the brake arm 12; this drawstring is joined with this free end via a spring 23 and penetrates the longitudinal bench 18 in the downward direction.

The chronological sequence and the succession of movements during braking correspond to the embodiment of FIG. 1. Here again, after actuating the brake by tensioning the drawstring 16, the brake lining 11 first of all contacts the turbine shaft 2. Upon a further pivoting of the brake arm 12, the friction wheel 19 is lifted off from the turbine shaft 2 in th upward direction by the swivel arm 7, so that the drive is interrupted. Also in this case, the braking procedure entails a minimum of losses while the turbine shaft 2 is yet constantly in secure engagement with the V-slot. Here again, the brake force expended is determined by the spring 9. Upon the startup of the spinning turbine 1, a reverse succession of motions takes place.

In case the drive is to be utilized for larger spinning turbines 1, it may be necessary in certain cases to prevent the friction wheel 19 from being immediately effective on the turbine shaft 2 with its full number of revolutions. For this purpose, a leaf spring 24 is attached to the column 22 in the embodiment of FIG. 3; this leaf spring carries, at its free end, a brake lining 25 associated with a brake sleeve 26 of the whorl 20 of the friction wheel 19. When the swivel arm 7 is pivoted, i.e., when the spinning turbine 1 is braked, the brake collar 26 contacts the brake lining 25, so that the friction wheel is braked. In order to avoid undue stress on the belt 21, it is advantageous to adjust the brake power of the brake lining 25 in such a manner that only the speed of the friction wheel 19 is reduced. Due to the fact that the speed of the whorl 20 is at this point still relatively low, the danger of wear and tear is relatively minor. In order to be able to adjust the brake effect of the leaf spring 24, the end of this spring resting on the column 22 is bent into a U-shape and held by a screw 27. In this manner, the braking effect can be varied by tightening the screw 27.

FIG. 5 shows an embodiment of the invention wherein the turbine shaft 2 of a spinning turbine 1 is supported in an air bearing which is only schematically indicated. The turbine shaft 2 is provided with a sleeve 28 contacted by a friction wheel 19 driven by a belt 29. The belt 29 extends around a whorl 20 of the friction wheel 19 disposed in a swivel arm 7. The swivel arm 7, pivotable about the pivot axle 8, is pulled downwardly by the belt 29, together with the friction wheel 19, so that the latter securely engages the turbine shaft 2 and/or the collar 28 thereof.

A brake arm 30 is pivotably arranged, concentrically with respect to the whorl 20 of the friction wheel 19, at the swivel arm 7, the brake arm being provided with a part 31 of the type of an eccentric disk. A brake lining 32 extending eccentrically with respect to the whorl 20 and thus to the pivot axis of the brake arm 30 is releasably secured in dovetail guides 33 at this part 31.

The brake arm 30 is held in the illustrated position by a tension spring 34, thus contacting an abutment 35. The tension spring 34 is hung into a pin 36 of the brake arm 30 and into a pin 37 provided in the zone of the pivot axle 8 of the swivel arm 7.

The free end of the brake arm 30 can be pivoted downwardly by means of a handle 38 or a drawstring 16. During this step, the brake lining 32 comes into contact with the collar 28 of the turbine shaft 2, namely to such an extent that the movement is terminated by a stop 39 which, in this embodiment, is fashioned integrally with the brake lining 32. During this movement, the swivel arm 7, after the brake lining 32 has come into contact with the collar 28 of the turbine shaft 2, is lifted off in the upward direction together with the friction wheel 19, so that the drive is interrupted.

In order to prevent too rapid a startup also in this embodiment, a brake lining 40 is provided which is associated with a brake sleeve 41 of a somewhat smaller diameter than the friction wheel 19. The brake lining 40 is disposed at the free end of an arm 42 fashioned as a leaf spring, which arm is mounted at a carrier bracket 43 to be rotatable about a pin 44. The other end of the brake arm 42, of a U-shaped structure, surrounds a bolt 45 of th lever 7 extended past the pivot axle 8. The pin 45 is adjustably provided on the swivel arm 7.

When the swivel arm 7 is pivoted upwardly, the pin 45 moves downwardly, whereby the brake lining 40 is pressed against the brake collar 41 of the friction wheel 19. Due to the adjustability of the pin 45, the braking effect can be adjusted.

Also in this embodiment, the friction wheel 19 serving as the drive means is lifted off from the turbine shaft 2 only when the braking effect is initiated, since only the brake arm resting with a brake lining against the turbine shaft 2 is equipped with an operating element, so that the swivel arm 7 can only be adjusted by way of the force of reaction effective on the brake lining 32.

The embodiment of the present invention shown in FIG. 6 corresponds, with respect to its function, essentially to the embodiment of FIG. 5 while it corresponds, with respect to its structure in principle, simultaneously extensively to the embodiment of FIG. 3 and FIG. 4. In this embodiment, a friction wheel 19 is provided for the turbine shaft 2 of a spinning turbine supported in the V-slot of two supporting disk pairs 3 and 4; this friction wheel is driven by a belt 29 and is mounted on a swivel arm 7 with the swivel axle 8. Via a joint 13, a brake arm 12 is attached to the free end of the swivel arm 7, the brake arm carrying a brake lining 11. The swivel arm 7 and the brake arm 12 are held in the illustrated operating position by a torsion spring arranged in the zone of the joint 13; in this position, the brake arm 12 contacts, with a buffer 15, a stop of the swivel arm 7. In addition to the tension of the belt 29, a spring 9 serves for urging the swivel arm 7 and thus the friction wheel 19 into the illustrated operating position.

For braking purposes, the brake arm 12 is pivoted about the joint 13 in the counterclockwise direction by means of a drawstring engaging the free end of the arm. After the brake lining 11 has come into contact with the turbine shaft 2, another swivel motion results in a lifting off of the friction wheel 19 from the turbine shaft 2 and thus in an interruption of the drive. During this process, the brake lining 11 contacts the turbine shaft 2 in an almost tangential manner. The movmeent of the brake arm 12 is limited by a fixed stop 46 which is adjustable in a suitable manner in order to be able to vary the braking effect.

The friction wheel 19 is provided with a brake sleeve 26 opposed by a brake lining 25, which latter is contacted by the brake sleeve when the swivel arm 7 is lifted, so that its speed is at least reduced. The brake lining 25 is mounted at a brake arm 24 consisting of a leaf spring.

In this embodiment, the bearing 47 of the friction wheel 19, provided with a whorl 20, is accommodated in a bearing shell 48 of th pivot arm 7, which bearing shell is open at the top, and wherein the bearing is secured by means of a spring plate 49. This way of supporting of the friction wheel 19 permits an extremely simple exchange.

Figure 7:
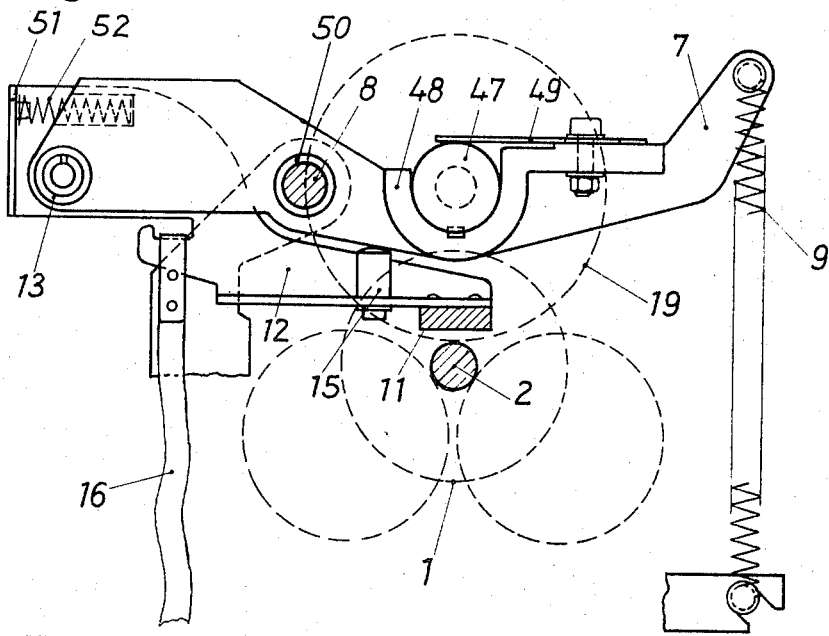

In the embodiment of FIG. 7, the turbine shaft 2, supported in a manner not illustrated in detail and pertaining to a spinning turbine, is driven by a friction wheel 19 shown in dashed lines. The friction wheel 19, driven in a manner not shown in detail, is supported in a swivel arm 7, the bearing corresponding to the embodiment of FIG. 6. The swivel arm 7 is mounted to be pivotable about a pivot axle 8 by means of a "Teflon" bushing 50. The friction wheel 19 is pressed against the turbine shaft 2 under the effect of the belt tension and optionally under the bias of an additional tension spring 9.

The swivel arm 7 is extended past its pivot axle 8. At this end, the arm exhibits a joint 13 serving as the mounting for a brake arm 12, the latter exhibitng a brake lining 11 in opposition to the turbine shaft 2. The brake arm 12, manufactured of sheet metal, is bent at an angle at its end 51, where a restoring spring 52 extending approximately in the direction of the swivel arm 7 is supported. This restoring spring 52 presses the brake arm 12 into the illustrated operating position wherein the brake lining 11 is lifted off from the turbine shaft 2 and wherein the brake arm 12 rests on the swivel arm 7 via a synthetic resin buffer 15.

In the zone between the joint 13 and the brake lining 11, a drawstring 16 is hung into the brake arm 12, this drawstring being connected to an actuating element in a manner not illustrated in detail.

Upon tensioning of the drawstring 16, the brake lining 11 first contacts the turbine shaft 2, overcoming the bias of the restoring spring 52. Upon further movement of the drawstring 16, the joint 13 is pulled downwardly, whereby the swivel arm 7 is pivoted about its pivot axle 8, and the friction wheel 19 is lifted off from the turbine shaft 2. The reverse order of motions occurs during startup.

In this embodiment, it is readily possible to dispose the friction wheel 19 directly on the secondary drive shaft of an electric motor attached to the swivel arm 7. In this connection, it is advantageous to insert a switch in the pivoting range of the swivel arm 7 in a manner not illustrated in detail, this switch shuts down the motor when the swivel arm 7 is pivoted.

Figure 8:
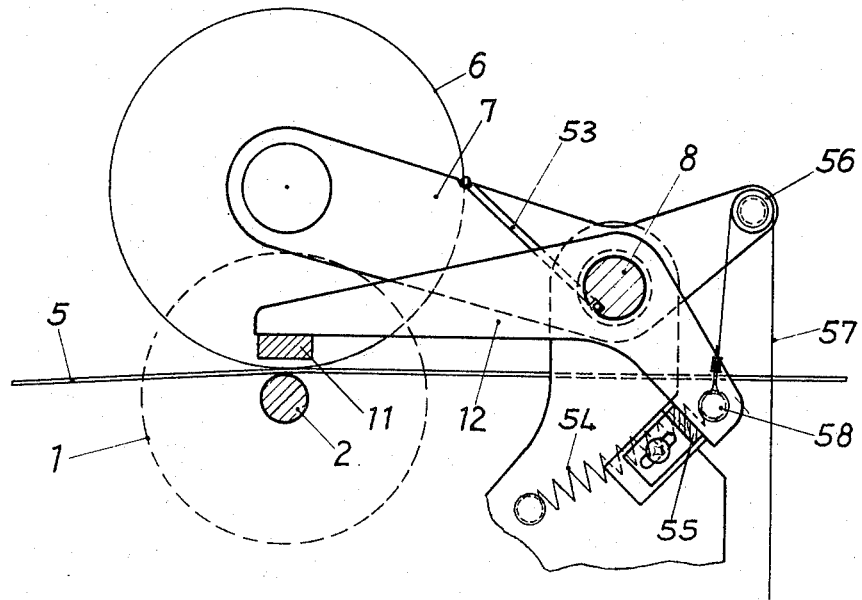

In FIG. 8, another embodiment of the invention is illustrated wherein the turbine shaft 2 of a spinning turbine 1 is supported in a manner not shown in detail, for example in the V-slot of two pairs of supporting rolls 3 and 4. The turbine shaft 2 is driven, for example, by way of a tangential belt 5 pressed against the turbine shaft 2 with a pressure roll 6. In this embodiment, the pressure roll 6 is practically in direct contact with the turbine shaft 2, which is advantageous in case of very small-scaled machines in order to avoid any troublesome influence on the tangential belt 5 by neighboring spinning assemblies.

The same arrangement, in principle, can also be employed for a drive wherein a friction wheel 19 is used in place of a pressure roll 6 which friction wheel has a whorl 20 driven by a belt 21, as shown, for example, in FIG. 3. In this case, the friction wheel 19 would be provided with a fitting which directly contacts the turbine shaft 2.

The pressure roll 6 or the friction wheel 19 is disposed on a swivel arm 7 pivotably mounted to move about a pivot axle 8. The swivel arm 7 is biased in the direction toward the turbine shaft 2 by means of a torsion spring 53.

A brake arm 12 is mounted to be concentrically pivotable about the same swivel axle 8; this arm is provided with a brake lining 11 associated with the turbine shaft 2. This brake arm 12 is held in the illustrated operating position by a spring 54; in this position, the brake arm contacts a stop 55 with an end extended beyond the pivot axle 8, which stop is adjustably attached to a part of the machine housing.

The swivel arm 7 is likewise extended past the pivot axle 8 and carries at this end a guide roller 56 over which a drawstring 57 is guided which is hung in a pin 58 of the brake arm 12.

The torsion spring 53 and the spring 54 are dimensioned so that, by pulling the drawstring 57, first only the brake arm 12 is pivoted about the swivel axle 8. The brake lining 11 of the brake arm 12 then contacts the turbine shaft 2, whereupon a further pulling of the drawstring 57 effects a pivoting of the swivel arm 7 by the force of reaction exerted on the brake lining 11 by the turbine shaft, the guide roller 56 approaching the pin 58. Thereby, the pressure roll 6 and/or the friction wheel 19 is lifted off from the turbine shaft 2.

In this embodiment, the swivel arm 7 and the brake arm 12 are arranged and fashioned in the manner of scissors, where basically only the brake arm 12 is movable directly by the operating means via the drawstring 57. In order to move the swivel arm 7, only a force of reaction is utilized which is produced when the movement of the brake arm 12 is limited by its contact against the turbine shaft 2. This embodiment can readily be modified in such a manner that, for example, the brake lining 11 contacts the turbine shaft 2 from the side facing away from the tangential belt 5. For this purpose, one would have to change either the shape of the scissor-like joined arms 12 and 7, or the coupling of the drawstring 57, which latter would then have to be joined, for example, between the brake lining 11 and the pivot axle 8 and/or between the axle of the pressure roll 6 or the friction wheel 19.

Figure 9:
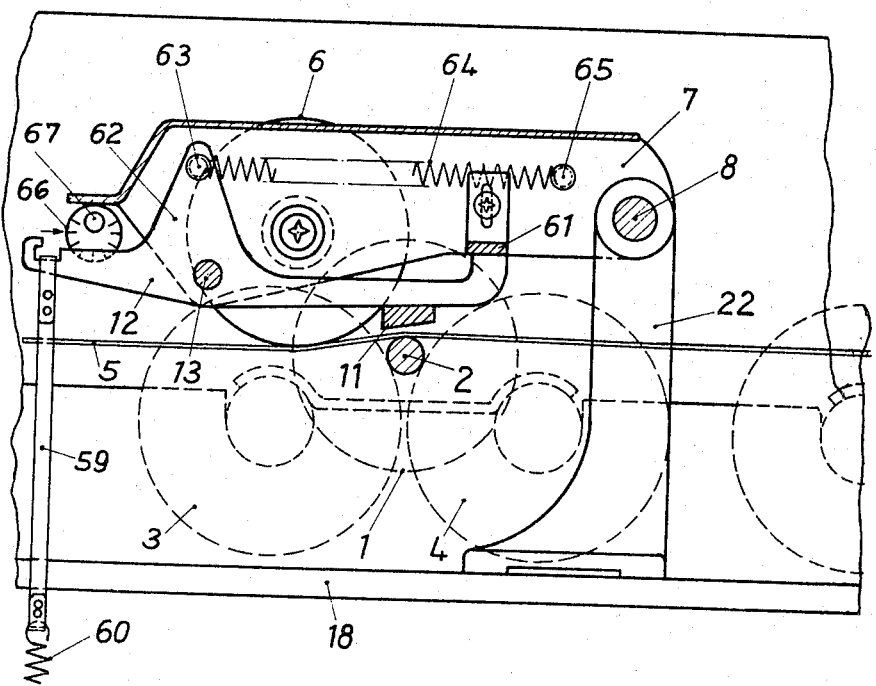

FIG. 9 shows an embodiment of the invention wherein a tangential belt 5 stressed by a pressure roll 6 drives the turbine shaft 2 of a spinning turbine 1, this shaft being supported in the V-slot formed by two supporting roll pairs 3 and 4. The supporting roll pairs 3 and 4 are disposed in a longitudinal stand 18 extending along the entire spinning machine, a column 22 for each spinning station being mounted at this stand. A swivel arm 7 with a pivot axle 8 is provided in the column, this arm receiving the pressure roll 6.

The swivel arm 7 is pulled downwardly by a drawstring 59; an energy storage means in the form of a spring 60 is connected with this drawstring. The latter engages a brake arm 12 attached to the swivel arm 7 to be movable about a joint 13. This brake arm 12, exhibiting a brake lining 11 disposed above the turbine shaft 2, is fashioned as a double-armed lever, the arm opposing the drawstring 59 resting on an adjustable stop 61 of the swivel arm.

The brake arm 12 is provided with a third arm 62 extending approximately vertically with respect to the two other arms. At this arm 62, a pin 63 is provided wherein a tension spring 64 is suspended, the other end of this spring being attached to a pin 65 of the swivel arm 7. The tension spring 64 extends approximately along the entire length of the swivel arm 7 and in the same direction as the latter. This tension spring 64 tends to pivot the brake arm 12 away from the swivel arm 7 against the force of the drawstring 59 and of the energy storage means 60.

In the operating position with the spinning turbine 1 in operation, the swivel arm 7 contacts, with its free end, a stop 66 fashioned as an eccentric disk and thus being adjustable, this stop being fixedly mounted. This stop 66 determines the stroke depth of the pressure roll 6 with respect to the tangential belt 5 and/or the turbine shaft 2.

For braking purposes, the drawstring 59 is loosened by a suitable operating element, not shown, so that the tension spring 64 can contract. Thereby, the brake arm 12 with the brake lining 11 is pivoted away from the swivel arm 7, and the brake lining 11 contacts the turbine shaft 2. Thereafter, by the force of the tension spring 64, the joint 13 is lifted together with the pressure roll 6. The movement is limited by an adjustable eccentric stop 67, so that a bracing action is produced between the turbine shaft 2 and the eccentric stop 67.

The eccentric stop 67 need not be adjusted with maximum accuracy, since the tension spring 64 serving for producing the braking force can be fashioned to be very long, so that it exhibits substantially constant contraction force. Consequently, minor differences in the adjustment of the eccentric stop 67 interfere only to a small extent, since only minor differences in the braking force can result therefrom.

In this embodiment, the topside of the swivel arm 7 can be constructed so that it surrounds the long tension spring 64 in the manner of a housing; as a consequence, a particularly pleasing and compact appearance is obtained.

In practice, it will be necessary in some cases to avoid the fixed adjustment of the pressure roll 6 to a predetermined stroke depth with respect to the turbine shaft 2. This is so, in particular, when very small machine dimensions exist, i.e. when the neighboring spinning assemblies are disposed in very close proximity to one another. If, in such an arrangement, the pressure roll 6 were provided at a relatively large distance from the turbine shaft 2 and, furthermore, had a large plunge depth, the influence of the pressure roll would also be transmitted to the proximate spinning assembly, so that it would not be possible to arrest an individual spinning assembly without larger friction losses. In such machines, it will thus be advantageous to place the pressure roll 6 as closely as possible to the turbine shaft 2. In this case, the elasticity of the tangential belt is hardly noticeable any more, so that it is suitable to mount the pressure roll 6 proper in an elastic manner. This can be attained in the embodiment of FIG. 9 in a simple way by removing the stops 61 and 66. Besides, it is possible to replace the drawstring 59 and the energy storage means 60 by a linkage or the like. The necessary resiliency is then achieved by relative movements between the swivel arm 7 and the brake arm 12 about the joint 13, the tension spring 64 being elastically deformed thereby.

Figure 10:
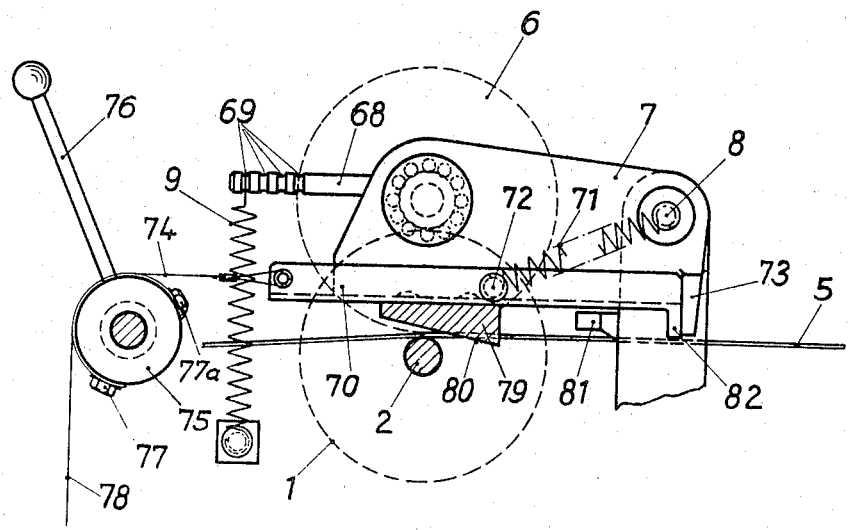

FIG. 10 shows an embodiment of the invention which deviates from the preceding embodiments in that the drive and brake mechanism does not exhibit two mutually rotatable arms. In FIG. 10, a spinning turbine 1 is shown with a turbine shaft 2 which is mounted in a manner not illustrated in detail and driven directly by means of a tangential belt 5. The tangential belt 5 is pressed against the turbine shaft 2 with a pressure roll 6. This pressure roll 6 is disposed in a swivel arm 7 pivotable about a swivel axle 8. The swivel arm 7 is extended, by means of a pin 68, past the pressure roll 6. This pin 68 is provided with several grooves 69 in which a tension spring 9 is suspended, this spring determining the contact pressure of the pressure roll 6. This contact pressure, which must be selected in dependence on the size of the spinning turbine 1 employed, can be varied by hanging the tension spring 9 int another groove 69 of the pin 68.

The lower edge of the swivel arm 7, which latter is positioned approximately horizontally, serves as the guide rail for a U-shaped slide 70 extending around this lower edge. This slide 70 is held at the swivel arm 7 merely by tension springs 71 disposed on both sides. The tension springs 71 are hung into the pivot axle 8 and into pins 72 attached approximately in the center of the slide 70. They pull the slide 70 obliquely upwardly so that a force component directed rearwardly is exerted on the slide, guiding the slide into its rest position wherein it contacts an abutment 73 of the swivel arm 7.

A drawstring 74 is attached to the other end of the slide 70 which can be wound up on a rewind roller 75 provided with an operating handle 76. The drawstring 74 attached to the slide 70 is mounted at the periphery of the windup roll 75 by means of a screw 77. A further drawstring 78 is wound up on the take-up roll 75 in the opposite direction and is attached by means of a screw 77a. The windup roll 75, which is pivoted in the counterclockwise direction for actuating the brake device which will be explained hereinbelow, can thus be operated via the handle 76 directly or, indirectly, by way of a foot-operated switch or the like. It is also possible to connect the windup roll to a device which is moved by pivoting or pulling or the like upon opening the housing enclosing the entire spinning assembly.

A brake lining 79 is attached to the slide 70; this lining has an inclined contact edge 80 which engages the turbine shaft 2 upon braking. The displacement motion of the slide 70 is limited by a stop 81 contacted by a downwardly oriented projection 82 of the slide 70.

Also in this embodiment of the invention, the pressure roll 6 is lifted off from the tangential belt 5 via the force of reaction produced during braking.

In all embodiments illustrated herein, the essential advantage is attained that the chronological sequence of the braking effect and the disengagement or engagement of the drive means is not changed even after a longer operating period and concomitant wear and tear, since the lifting or lowering of the drive means is controlled indirectly via the brake which alone is provided with an operating element.

In all embodiments, the advantage is furthermore achieved that the drive means forms a structural unit with the brake device, which can be pivoted out of the way after disengagement or disconnection of the operating element, whereby the accessibility to the turbine bearing is facilitated. In particular, this facilitates the insertion of a tangential belt 5 exerting its driving power directly on the turbine shaft 2.

Besides, all embodiments permit a compact arrangement, while utilizing, at the same time, a small number of uncomplicated structural parts.

While I have shown and described several embodiments in accordance with the present invention, it is understood that the same is not limited thereto but is susceptible of numerous changes and modifications as known to a person skilled in the art, and I therefore do not wish to be limited to the details shown and described therein but intend to cover all such changes and modifications as are within the scope of those skilled in the art.

I claim:

1. An arrangement for driving and braking a rotatable turbine shaft of an open-end spinning assembly comprising:

support means for supporting the turbine shaft in position, said support means including radial support means at one side of said turbine shaft for limiting radial movement of said turbine shaft toward said one side, selectively engageable driving means for imparting rotational movement to said turbine shaft, said driving means including driving shaft contacting means which force said turbine shaft against said radial support means to aid in radially supporting said turbine shaft during driving thereof, selectively engageable braking means for imparting braking forces to said turbine shaft, said braking means including braking shaft contacting means which force said turbine shaft against said radial support means to aid in radially supporting said turbine shaft during braking thereof, and interconnecting means for transferring reaction forces experienced by said braking shaft contacting means during engagement of said braking means as disengaging forces which disengage said driving shaft contacting means with increased braking forces against said turbine shaft being accompanied by an automatic decrease in driving forces against said turbine shaft and with one of said driving shaft contacting means and said braking shaft contacting means forcing said turbine shaft against said radial support means at all times during engagement and disengagement of said driving and braking means, whereby a firm radial support of said turbine shaft is assured during transition between driving and braking theroef, wherein said braking shaft contacting means is a brake lining, wherein said interconnecting means includes a brake arm and a movable element, said brake arm having said brake lining of the braking means attached thereto, wherein means are provided for moving said movable element with said driving shaft contacting means to force said driving shaft contacting means into driving engagement with said turbine shaft when said movable element is in a first driving engagement position, and wherein said brake arm and movable element are movably connected to one another for transmitting reaction forces acting on said brake lining to move said movable element from said driving engagement position.

2. An arrangement according to claim 1, wherein said means for supporting said turbine shaft in position includes a plurality of supporting disks forming a V-shaped slot for the turbine shaft.

3. An arrangement according to claim 2, wherein the driving means includes a friction wheel which forms said driving shaft contacting means and which is directly engageable with said turbine shaft and a drive belt for rotatably driving said friction wheel, and further comprising a friction wheel brake for braking said friction wheel upon disengagement of the driving means.

4. An arrangement according to claim 3, wherein said friction wheel brake includes a brake lining mounted on an adjustable spring at a fixed position, and wherein said friction wheel is moved into engagement with said brake lining upon disengagement of said friction wheel from said turbine shaft.

5. An arrangement according to claim 3, wherein the driving means includes a bearing means for rotation imparting means of the driving means, said bearing means being secured in position by means of a spring plate mounted in a bearing shell of the swivel arm.

6. An arrangement according to claim 2, wherein said driving means includes a rotatably driven friction wheel forming said driving shaft contacting means and which is directly engageable with said turbine shaft.

7. An arrangement according to claim 6, wherein said movable element is constructed as a spring-loaded swivel arm, and wherein said brake arm is pivotally attached to said swivel arm.

8. An arrangement according to claim 2, wherein said driving means includes a tangential belt which forms said driving shaft contacting means and which is directly engageable with said turbine shaft and drive rollers engageable with said tangential belt for moving said belt into engagement with said turbine shaft.

9. An arrangement according to claim 8, wherein said movable element is constructed as a spring-loaded swivel arm, and wherein said brake arm is pivotally attached to said swivel arm.

10. An arrangement according to claim 1, wherein said movable element is constructed as a spring-loaded swivel arm, and wherein said brake arm is pivotally attached to said swivel arm.

11. An arrangement according to claim 10, wherein said brake arm is eccentrically attached to said swivel arm with respect to the pivot axis of said swivel arm.

12. An arrangement according to claim 11, wherein the driving means includes a drive roller rotatably mounted in a bearing of the swivel arm, wherein the brake arm is eccentrically attached to a free end of the swivel arm projecting beyond the bearing, said brake arm extending from a free end thereof in a direction substantially parallel to the swivel arm, and wherein a brake operating means engages the free end of the brake arm.

13. An arrangement according to claim 12, wherein a buffer member is disposed between the brake arm and the swivel arm for limiting relative movement of said brake arm and swivel arm in the direction caused by the swivel arm spring.

14. An arrangement according to claim 11, wherein a spring is disposed between the swivel arm and brake arm for normally biasing said arms in the direction corresponding to engagement of the driving means and disengagement of the braking means.

15. An arrangement according to claim 10, wherein a buffer member is disposed between the brake arm and the swivel arm for limiting relative movement of said brake arm and swivel arm caused by the swivel arm spring.

16. An arrangement according to claim 15, wherein said buffer member is formed of synthetic resinous material.

17. An arrangement according to claim 16, wherein said buffer member is elastic.

18. An arrangement according to claim 10, wherein th pivot axis of said swivel arm is located between the pivotal attachment of said brake arm to said swivel arm and a bearing for rotation imparting means of said driving means.

19. An arrangement according to claim 18, wherein said radial support means includes a plurality of supporting disks forming a V-shaped slot for the turbine shaft.

20. An arrangement according to claim 18, wherein a spring is disposed between the swivel arm and brake arm for normally biasing said arms in the direction corresponding to engagement of the driving means and disengagement of the braking means.

21. An arrangement according to claim 10, wherein the brake arm is pivotally attached to said swivel arm at the pivot axis of the swivel arm, and wherein a drawstring for actuating the braking means is fixedly attached to one of said brake arm and swivel arm and is extended over a portion of the other of said brake arm and swivel arm.

22. An arrangement according to claim 21, wherein the brake arm and swivel arm have free end portions spaced from the pivot axis of the swivel arm, and wherein the drawstring engages these free end portions.

23. An arrangement according to claim 21, wherein separate springs engage the respective brake arm and swivel arm to hold said arms in a position corresponding to engagement of said driving means and disenggement of said braking means.

24. An arrangement according to claim 10, wherein a tensioned drawstring is provided for holding the brake and swivel arms in a position corresponding to engagement of the driving means, and wherein an expanding spring is mounted between the swivel arm for moving said brake and swivel arms to a position corresponding to engagement of the braking means when the tensioned drawstring is loosened.

25. An arrangement according to claim 24, wherein the brake arm contacts an adjustable stop on the swivel arm when said brake and swivel arms are in a position corresponding to engagement of the driving means.

26. An arrangement according to claim 25, wherein the swivel of arm contacts an adjustable stop which is spaced from said brake arm when said brake and swivel arms are in a position corresponding to engagement of the driving means.

27. An arrangement according to claim 26, wherein an adjustable stop is provided for limiting movement of said swivel arm in the driving means disengaging direction.

28. An arrangement according to claim 25, wherein an adjustable stop is provided for limiting movement of said swivel arm in the driving means disengaging direction.

29. An arrangement according to claim 24, wherein the swivel arm contacts an adjustable stop which is spaced from said brake arm when said brake and swivel arms are in a position corresponding to engagement of the driving means.

30. An arrangement according to claim 29, wherein an adjustable stop is provided for limiting movement of said swivel arm in the driving means disengaging direction.

31. An arrangement according to claim 24, wherein an adjustable stop is provided for limiting movement of said swivel arm in the driving means disengaging direction.

32. An arrangement according to claim 10, wherein a spring is disposed between the swivel arm and brake arm for normally biasing said arms in the direction corresponding to engagement of the driving means and disengagement of the braking means.

33. An arrangement according to claim 10, wherein the driving means includes a bearing means for rotation imparting means of the driving means, said bearing means being secured in position by means of a spring plate mounted in a bearing shell of the swivel arm.

34. An arrangement according to claim 33, wherein said shell is open toward the top.

35. An arrangement according to claim 33, wherein a spring is attached to a free end of said spring plate for biasing said swivel arm in the driving means engagement direction.

36. An arrangement according to claim 1, wherein said movable element is constructed as a spring-loaded swivel arm, and wherein said brake arm is slidably attached to said swivel arm.

37. An arrangement according to claim 36, wherein the brake lining has an oblique contact edge for engaging the turbine shaft when the braking means is engaged.

38. An arrangement according to claim 37, wherein the brake lining is disposed on a U-shaped slide open toward the swivel arm, said slide being held at the swivel arm by means of obliquely positioned springs.

39. An arrangement according to claim 1, wherein said movable element is constructed as a spring-loaded swivel arm, wherein the pivotal attachment of said brake arm to said swivel arm is concentric to a bearing for rotation imparting means of the driving means, and wherein the brake lining is curved eccentrically with respect to said bearing.

40. An arrangement according to claim 39, wherein the brake lining is provided on a cam-like portion of the brake arm which is eccentrically curved with respect to said pivotal attachment.

41. An arrangement according to claim 40, wherein said brake lining is exchangeably mounted on said cam-like portion.

42. An arrangement according to claim 39, wherein a spring is disposed between the swivel arm and brake arm for normally biasing said arms in the direction corresponding to engagement of the driving means and disengagement of the braking means.

43. An arrangement according to claim 1, wherein the brake lining has an oblique contact edge for engaging the turbine shaft when the braking means is engaged.

44. An arrangement according to claim 1, wherein the driving means includes a friction wheel which forms said driving shaft contacting means and which is directly engageable with said turbine shaft and a drive belt for rotatably driving said friction wheel, and further comprising a friction wheel brake for braking said friction wheel upon disengagement of the driving means.

45. An arrangement according to claim 44, wherein said friction wheel brake includes a brake lining mounted on an adjustable spring at a fixed position, and wherein said friction wheel is moved into engagement with said brake lining upon disengagement of said friction wheel from said turbine shaft.

46. An arrangement according to claim 1, wherein said driving means includes a rotatably driven friction wheel which forms said driving shaft contacting means and which is directly engageable with said turbine shaft.

47. An arrangement according to claim 1, wherein said driving means includes a tangential belt which forms said driving shaft contacting means and which is directly engageable with said turbine shaft and drive rollers engageable with said tangential belt for moving said belt into engagement with said turbine shaft.

48. An arrangement for driving and braking a rotatable shaft comprising:
  support means ofr supporting the shaft in position, said support means including radial support means at one side of said shaft for limiting radial movement of said shaft toward said one side,
  selectively engageable driving means for imparting rotational movement to said shaft, said driving means including driving shaft contacting means which force said shaft against said radial support means to aid in radially supporting said support shaft during driving thereof,
  selectively engageable braking means for imparting braking forces to said shaft, said braking means including braking shaft contacting means which force said shaft against said radial support means to aid in radially supporting said shaft during braking thereof,
  and interconnecting means for transferring reaction forces experienced by said braking shaft contacting means during engagement of said braking means as disengaging forces which disengage said driving shaft contacting means with increased braking forces against said shaft being accompanied by an automatic decrease in driving forces against said shaft and with one of said driving shaft contacting means and said braking shaft contacting means forcing said shaft against said radial support means at all times during engagement and disengagement of said driving and braking means, whereby a firm radial support of said shaft is assured during transition between driving and braking thereof,
  wherein said braking shaft contacting means is a brake lining, wherein said interconnecting means includes a brake arm and a movable element, said brake arm having said brake lining of the braking means attached thereto, wherein means are provided for moving said movable element with said driving shaft contacting means to force said driving shaft contacting means into driving engagement with said shaft when said movable element is in a first driving engagement position, and wherein said brake arm and movable element are movably connected to one another for transmitting reaction forces acting on said brake lining to move said movable element from said driving engagement position.

49. An arrangement according to claim 48, wherein said movable element is constructed as a spring-loaded swivel arm, and wherein said brake arm is pivotally attached to said swivel arm.

50. An arrangement according to claim 48, wherein said movable element is constructed as a spring-loaded swivel arm, and wherein said brake arm is slidably attached to said swivel arm.

51. An arrangement according to claim 48, wherein said movable element is constructed as a spring-loaded swivel arm, and wherein said brake arm is eccentrically attached to said swivel arm with respect to the pivot axis of said swivel arm.

52. An arrangement for driving and braking a rotatable turbine shaft of an open-end spinning assembly comprising:
means for supporting the turbine shaft in position,
selectively engageable driving means for imparting rotational movement to said turbine shaft,
selectively engageable braking means for imparting braking forces to said turbine shaft,
and interconnecting means for simultaneously disengaging said driving means in response to engagement of said braking means,
wherein said interconnecting means includes a brake arm and a moveable element, said brake arm having a brake lining of the braking means attached thereto, said movable element being engageable with a rotation imparting means of said driving means to engage said driving means when said movable element is in a first driving engagement position, said brake arm and said movable element being movably connected to one another for transmitting reaction forces acting on said brake lining to move said movable element from said driving engagement position, wherein said movable element is constructed as a spring-loaded swivel arm, and wherein said brake arm is eccentrically attached to said swivel arm with respect to the pivot axis of said swivel arm.

53. An arrangement according to claim 52, wherein the driving means includes a drive roller rotatably mounted in a bearing of the swivel arm, wherein the brake arm is eccentrically attached to a free end of the swivel arm projecting beyond the bearing, said brake arm extending from a free end thereof in a direction substantially parallel to the swivel arm, and wherein a brake operating means engages the free end of the brake arm.

54. An arrangement according to claim 53, wherein a buffer member is disposed between the brake arm and the swivel arm for limiting relative movement of said brake arm and swivel arm in the direction caused by the swivel arm spring.

55. An arrangement according to claim 52, wherein a spring is disposed between the swivel arm and brake arm for normally biasing said arms in the direction corresponding to engagement of the driving means and disengagement of the braking means.

* * * * *